C. H. CAMPBELL.
DRYING MILK.
APPLICATION FILED DEC. 29, 1913.

1,250,427.

Patented Dec. 18, 1917.

WITNESSES:

INVENTOR:
Charles H. Campbell,
By Attorneys,

UNITED STATES PATENT OFFICE.

CHARLES H. CAMPBELL, OF NEW YORK, N. Y., ASSIGNOR, BY MESNE ASSIGNMENTS, TO BORDEN'S CONDENSED MILK COMPANY, OF NEW YORK, N. Y., A CORPORATION OF NEW JERSEY.

DRYING MILK.

1,250,427.   Specification of Letters Patent.   Patented Dec. 18, 1917.

Application filed December 29, 1913.  Serial No. 809,297.

*To all whom it may concern:*

Be it known that I, CHARLES H. CAMPBELL, a citizen of the United States, residing in the borough of Manhattan, city, county, and State of New York, have invented certain new and useful Improvements in Drying Milk, of which the following is a specification.

This invention aims to provide a method of making a dry milk which is highly porous, light and fluffy and has a high solubility.

The accompanying drawings illustrate more or less diagrammatically apparatus for carrying out the process.

Figure 1:
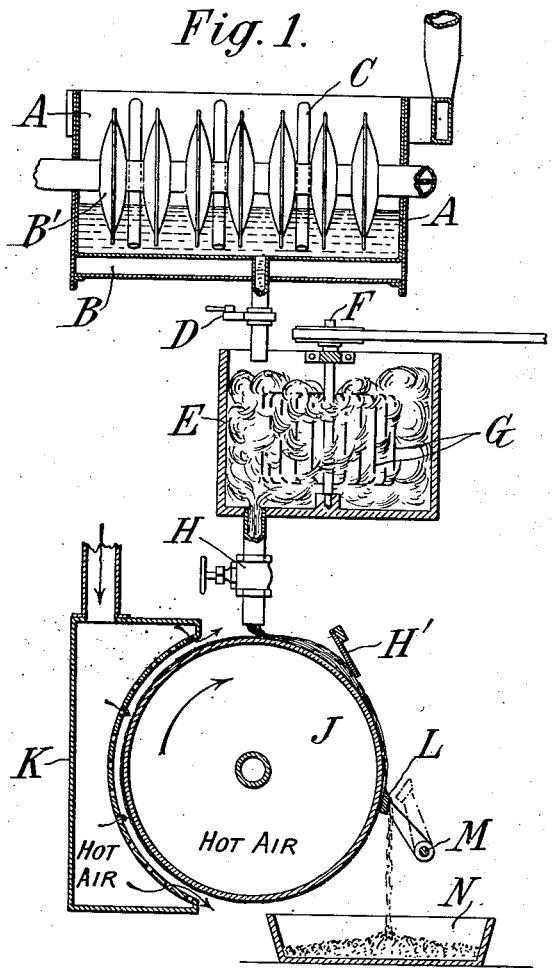

Figure 1 showing one style of apparatus, and

Figure 2:
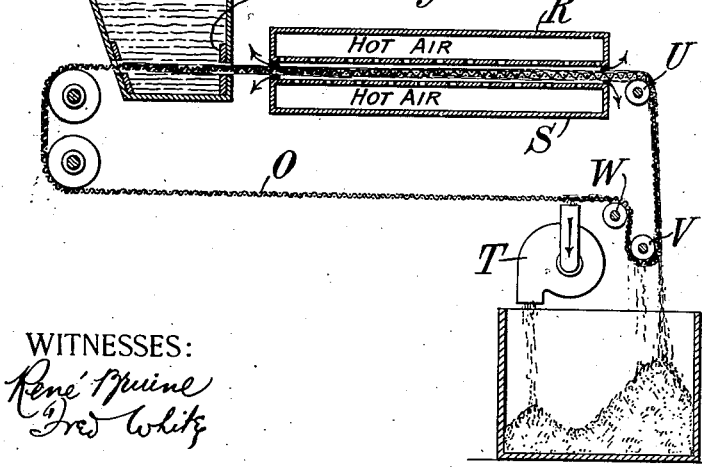

Fig. 2 another style.

In previous patents I have described methods of making dry milk by eliminating a quantity of the water and exposing the milk thus thickened to hot air in various ways, the dry milk in some cases being ground to secure the necessary fineness. These methods have produced a product in which the milk solids are preserved practically unchanged, but the particles are comparatively dense so that while of a soluble nature they have been slow to dissolve in water. The dry milk made by the present invention is of less density, being in fact light and porous so that it dissolves more rapidly than that made by previous processes.

The desired result is secured by aerating the thickened milk, by whipping, blowing air through, or other suitable process so as to convert it to a mass whose weight is only one-half or one-third (or even less) that of the same volume of ordinary milk; and then drying this whipped or foamy mass by any one of various methods of exposing large surfaces thereof to hot air. Because of the foamy nature of the mass it solidifies in a porous, friable or crumbly mass which is easily reduced to particles of greater or less size according to the use to which it is to be put. Where extreme dryness is important these solid particles can afterward be further dried in any one of various ways.

Referring now to the apparatus illustrated, A is a concentrator of a type covered in my application No. 781,081, filed July 25, 1913, in which the milk may be reduced to a fraction of its original volume by circulating hot water through the jacket B and drums B', and blowing large volumes of air through the pipes C. When the milk is sufficiently concentrated in this first tank A it may be let out through a valve D into a whipper E of any ordinary type. In the case shown the whipper comprises simply a tank in which is a belt driven shaft F carrying curved wires or rods G which stir the material and aerate it. The construction, as shown in the drawing, is such that the stirring instrumentalities, *i. e.*, wires or rods, pass through the viscid mass with a smoothly cutting, as distinguished from either an ebulliting or a kneading, action, whereby is secured indefinitely repeated cutting of the occluded air into smaller and smaller subdivisions with comparatively small levitation or expulsion thereof, or conversion of the mass throughout into mere froth or foam. In this machine the milk is brought to a foamy mass. Therefrom it passes through a valve H by which the flow can be regulated onto a slowly revolving drum J which is heated internally by hot air or hot water, and upon the outside of which is a hot air box K having a face fitting fairly close to the drum and provided with numerous small perforations through which jets of hot air are blown upon the outer face of the drum. The material is, as becomes possible owing to its resulting relatively stable, coherent, plastic and adhesive character, spread on the drum by means of a blade or spreader H' in the form of a thin sheet or coating, and after one or more revolutions is sufficiently dry to be removed. After partial or complete drying of the first coat additional coats may be applied and successively dried. After drying the last coat a scraper L mounted on arms on a shaft M is pressed against the surface of the drum. As the latter continues to revolve the solidified mass is scraped off and falls into a tray or other receptacle N from which it may be put in packages; or it may be further dried and ground and bolted if this be desired.

As an example of my process the concentration in the first tank A may be carried to such an extent as to reduce the volume to one-sixth of the original volume, after which the concentrated milk is run into the whipper E. Or this concentrated milk may be kept for a comparatively long time before being again used. This concentrated milk is an article of commerce, and may be made in the manner described, or may be made in various other ways. The milk thus concentrated and run into the whipper is preferably thinned by the addition of a certain amount of water, the added water being, say, 50 per cent. of the volume of the concentrated milk. If the original concentration is greater the amount of water added may be greater. Or where the concentrated milk is run directly from the concentrator into the whipper the concentration may be stopped at an earlier time so as to give the same result, the mass being reduced, say, to one-fourth of its original volume. The thinner the mass introduced into the whipper the more porous the product, and the more quickly the product can be dissolved. Therefore it is desirable to use as thin a milk in the whipper as is practicable. I have found that if it be thinner than about one-fourth of its original volume the whipping does not materially increase its mass, or the air introduced by the whipping is not held in the mass, the milk being too thin to hold the air. Taking milk concentrated to about one-fourth its original volume (either in the first concentration, or by the greater concentration and subsequent addition of water) it may be whipped and in a comparatively short time increased to two or three times its volume or more. This means, of course, that the volume of air occluded in the milk is equal to once or twice the volume of the milk itself.

The whipped mass should be spread on the drying drum fairly uniformly and evenly. As it dries it shrinks and cracks, due probably to both the shrinkage and the expansion of air bubbles, and it is freed very easily from the drum, coming off in a mixture of porous flakes and finer particles due to its crumbly nature.

The apparatus above described are well known apparatus for concentrating and whipping and drying and may be substituted by other known apparatus for performing such operations. A substitute for the drying drum of Fig. 1 is shown in Fig. 2 in which a flexible wire or cloth net O runs through the tank P of whipped milk and runs between spreaders Q and through a pair of hot air boxes R and S, one on each side of the belt. The rate of travel of the belt is such, and the length of the hot air boxes is so proportioned that a single passage of the belt through the box serves to dry the milk which is carried in a thin sheet in the interstices of the belt. The milk is then readily scraped and brushed off or broken by passing over small rollers U, V, and W, and the residue sucked off by a suction fan T.

An air blast apparatus adapted and regulated to produce the said frothy mass may be used for whipping if preferred. The whipping, besides aerating the product, whitens it by the exposure to air. It will be whipped more or less according to its original condition.

The material is so spongy when it comes off the drying roll or drying belt that it is not only more quickly soluble, but it also readily absorbs water from the atmosphere. To avoid this if it is to be kept for any length of time, it should be further dried in an oven immediately after removal from the drum or belt.

The product may contain any desired percentage of cream which should, however, be separately whipped and added to the whipped, concentrated milk.

The foregoing process assumes that the milk is uncooked, or has not been heated above the coagulating temperature. The process may, however, be used for securing a cooked product. In this case, after concentration the milk is heated by a steam jet directed into the milk and is thus thickened by coagulation, after which it is whipped or aerated in any of the ways above described, and dried in the way above described, or in any other suitable way.

The process is also applicable to the drying of eggs, blood and similar liquids containing solids in solution or in suspension, and produces a similar highly porous, light, fluffy and friable product.

What I claim is:—

1. The method of treating milk which comprises first concentrating it; next, converting the concentrate into an aerated, coherent, plastic, adhesive, mass; next, shaping said mass into a sheet of uniform thickness; and, finally, drying said sheet.

2. The method of treating milk which comprises first concentrating it; next, converting the concentrate into an aerated, coherent, plastic, adhesive, mass; next, spreading said mass upon an air-permeable support; and, finally, drying it.

3. The method of treating milk which comprises first concentrating it; next, converting the concentrate into an aerated, coherent, plastic, adhesive, mass; next, passing through said mass a pervious belt having interstices; and, finally, drying the portions of said mass adherent to, and carried by, said belt.

4. The method of treating milk which comprises first concentrating it; next, converting the concentrate into an aerated, coherent, plastic, adhesive, mass; next, passing through said mass a pervious belt having interstices; next, imparting to the portions of said mass adherent to, and carried by, said belt, the form of a sheet or uniform thickness; and, finally, drying said sheet.

5. The method of treating milk which comprises first concentrating it; next, converting the concentrate into an aerated, coherent, plastic, adhesive, mass; next, passing through said mass a pervious belt having interstices; next, imparting to the portions of said mass adherent to, and carried by, said belt, the form of a sheet of uniform thickness; and, finally, drying said sheet by further passing said belt between a pair of hot air boxes.

6. The method of treating milk which comprises separating its cream therefrom; next, concentrating the thus skimmed milk; converting said concentrate into an interiorly aerated coherent, plastic, adhesive, mass; aerating the cream; adding it to said mass; and drying the resulting mixture.

7. The method of treating milk which comprises first concentrating it; next, heating it above the coagulating temperature; next, converting the so heated concentrate into an interiorly aerated, coherent, plastic, adhesive, mass; and, finally, drying said mass.

8. The method of treating milk which comprises first concentrating it; next converting the concentrate into an aerated, coherent, plastic, adhesive, mass; next spreading said mass upon a flexible wire net, and finally drying it.

In witness whereof, I have hereunto signed my name in the presence of two subscribing witnesses.

CHARLES H. CAMPBELL.

Witnesses:
　FRED WHITE,
　WILLIAM F. MARTINEZ.